United States Patent [19]

Curtis et al.

[11] Patent Number: 5,336,311
[45] Date of Patent: Aug. 9, 1994

[54] CATIONIC PIGMENTS

[75] Inventors: Jerry L. Curtis, Milledgeville, Ga.; Kenneth A. Johnson, Fayetteville, N.Y.; Lester W. House, Macon, Ga.

[73] Assignee: Nord Kaolin Company, Jeffersonville, Ga.

[21] Appl. No.: 909,388

[22] Filed: Jul. 7, 1992

[51] Int. Cl.$^5$ ............................................. C04B 14/36
[52] U.S. Cl. ..................................... 106/416; 106/419; 106/423; 106/430.1; 106/448; 106/449; 106/471; 106/486; 106/491; 106/499; 501/12
[58] Field of Search ................ 106/419, 423, 416, 430, 106/448, 449, 471, 486, 491, 499; 501/12

[56] References Cited

U.S. PATENT DOCUMENTS

| | | | |
|---|---|---|---|
| 1,221,929 | 4/1917 | Brociner | 8/94.27 |
| 2,757,085 | 7/1956 | Paquin | 162/181.3 |
| 2,902,399 | 10/1959 | Paquin | 162/181 |
| 3,190,789 | 6/1965 | Taylor | 162/181 |
| 3,784,392 | 1/1974 | Bertorelli | 106/468 |
| 3,804,656 | 4/1974 | Kaliski et al. | 106/487 |
| 4,026,721 | 5/1977 | Kurrie | 106/416 |
| 4,029,885 | 6/1977 | Buikema | 536/50 |
| 4,072,537 | 2/1978 | Kurrie | 106/416 |
| 4,075,030 | 2/1978 | Bundy et al. | 106/416 |
| 4,076,548 | 2/1978 | Bundy et al. | 106/416 |
| 4,078,941 | 3/1978 | Bundy et al. | 106/409 |
| 4,117,191 | 11/1978 | Kurrie | 421/330 |
| 4,146,515 | 3/1979 | Buikema | 524/610 |
| 4,346,178 | 8/1982 | Economou | 501/148 |
| 4,445,970 | 5/1984 | Post et al. | 162/135 |
| 4,640,716 | 2/1987 | Cleland | 106/161 |
| 4,738,726 | 4/1988 | Pratt et al. | 106/487 |
| 4,767,466 | 8/1988 | Nemeh et al. | 106/487 |
| 4,806,167 | 2/1989 | Raythatha | 106/465 |
| 4,818,294 | 2/1989 | Raythatha et al. | 106/486 |
| 4,820,554 | 4/1989 | Jones et al. | 106/466 |
| 4,851,048 | 7/1989 | Jones et al. | 106/466 |
| 4,863,796 | 11/1989 | Wason | 428/331 |
| 5,006,574 | 4/1991 | Sennett et al. | 523/351 |
| 5,087,597 | 2/1992 | Leal et al. | 502/62 |
| 5,116,418 | 5/1992 | Kaliski | 106/419 |

FOREIGN PATENT DOCUMENTS 0382427  8/1990  European Pat. Off. .

Primary Examiner—Karl Group
Assistant Examiner—Scott L. Hertzog
Attorney, Agent, or Firm—Darby & Darby

[57] ABSTRACT

This invention relates to structural aggregate pigment products that are cationic, and have improved wet-end retention. A method for converting anionic pigments to cationic pigments is also provided. More particularly, a structural aggregate pigment comprising a clay and/or titanium dioxide or other particulate components, and a functional microgel made from silicon and aluminum or zinc gel formers and a gelling agent such as calcium chloride, can be cationized by adding an effective amount of modified or unmodified epichlorhydrin dimethylamine condensate to a slurry of the structured pigment. The resulting cationic pigments have superior papermaking characteristics and a much improved retention.

26 Claims, No Drawings

CATIONIC PIGMENTS

This invention relates to structural aggregate pigment and filler products that are cationic, and have improved wet-end retention. A method for converting anionic pigments to cationic pigments is also provided.

BACKGROUND OF THE INVENTION

Pigments are finely divided particulate solids which for use are typically dispersed in vehicles or on a substrate, such as inks, paints, or polymeric materials. Pigments may be organic or inorganic, and are usually unaffected by the vehicle or medium in which they are incorporated. They may alter appearance by selective absorption or by scattering light, and are often used as an integral part of decorative, protective and functional coatings. Pigments may be colored, colorless, black or white. Some pigments are corrosion inhibitors, fungistats, and/or antistatic agents. In general, pigments are insoluble solids and remain insoluble when dispersed in a vehicle, as contrasted with dyes, which are soluble.

Pigment particles may vary in size, shape and surface area. In commercial applications, typical particles are from 0.01–10.0 $\mu$m in diameter and range from 1–1100 $m^2/g$ in surface area. To achieve complete dispersion of a pigment in a vehicle, the surfaces of the pigment particles must be properly wetted.

Extender pigments are colorless or white pigments, generally with a refractive index less than 1.7. One example of an extender pigment is kaolin, a hydrous aluminosilicate mineral used as a filler in the paper and paperboard industry, and in paper coatings. As one example, pigmented paper may have a thin kaolin or other pigment coating. Calcined kaolins are white and hard, and are used for example in paper and in water based paints. Other extender pigments include clays, calcium carbonates, talc (magnesium silicates), and titanium dioxide.

Finely divided white mineral fillers may be added to improve optical and physical properties of paper sheets, primarily by filling the spaces between fibers. This produces a denser, softer, brighter and more opaque sheet, and may reduce cost because many fillers are less expensive than fibers. Clay is the most common filler, while talc is noted for its softness. Calcium carbonate is generally brighter than clay but can be used only in neutral or alkaline systems because of its solubility at lower pH levels. Titanium dioxide provides higher brightness and superior opacity, but is relatively expensive and inefficient. For example, as much as fifty percent of the titanium dioxide added to papermaking stock may be lost as waste, probably through formation of filler particles too large to remain on the paper.

Structured pigments are those which have been structurally modified, usually by thermal or hydrothermal chemical reactions. The most common structured pigment is calcined clay. Other structured pigments include aggregates comprising particulate matter treated with complex functional gels. A structured aggregate pigment of this type is described in Kaliski, et al., U.S. Pat. No. 5,116,418.

In papermaking, a variety of extenders, pigments, fillers, and dyes my be used to furnish or enhance specific sheet properties. These and other additives are often applied to wet paper stock during the manufacturing process, and are commonly referred to as "wet end" additives. Thus, "wet end retention," or the ability of an additive to adhere to wet stock, is an important operational parameter. An optically efficient pigment is readily retained, and has a high wet end retention, expressed as a percent of total pigment used.

At least two measures of pigment retention are in common use. One is overall retention, which is the percent of total pigment added to the stock that is retained by the paper. The second measure is single-pass retention, and is the percent of pigment retained by the paper after a single pass or application.

Overall retention is important economically, because any additive which is not retained is lost, or must be recovered and recycled. Single-pass retention is a measure of sheet quality and affects paper machine operation. Pigments with a low single-pass retention require additional recycling (i.e. repeated applications of pigment) and frequently result in a non-uniform pigment distribution. Low retention can cause an uneven distribution in the cross-section of the sheet, and may produce different surface properties on the two sides of the sheet, a phenomenon known as "two-sidedness." Undesirable buildups and agglomerations may also occur in the paper machine.

Percent first pass retention can be calculated according to the following formula:

$$\text{Percent First Pass Retention} = \left(\frac{Cf - Cw}{Cf}\right) \times 100$$

where Cf is the % consistency (solids content) of the furnish or papermaking stock and Cw is the % consistency of the whitewater, or waste runoff. The first pass retention of a particular pigment or filler in a papermaking furnish can be calculated by the "Percent first pass ash retention" method, according to the formula:

$$\text{Percent First Pass Ash Retention} = \left(\frac{CfAf - CwAw}{CfAf}\right) \times 100$$

where Af is the % filler ash of the furnish and Aw is the % filler ash of the whitewater. The ash retention, also discussed below, is the ratio of the amount of ash in the paper to the total amount of ash in the papermaking system, expressed as a percent. The ash content is determined by filtering, burning, and weighing steps, to separate the pigment from the other papermaking materials.

Two basic mechanisms for retention have been recognized: absorption and filtration. Larger particles tend to be retained by filtration; the particles become enmeshed in and bound by the paper-making fibers during the manufacturing process. Smaller particles are retained by absorption. Factors affecting retention include the amount, particle size, shape and density of the fillers, the order in which different materials are introduced to the paper stock, and the ionic balance of the paper stock components. Retention is also affected by the conditions in the paper machinery and at the paper-forming wire. Temperature, pH, type of pulp fibers, sheet weight, wire mesh size, type of dewatering, degree of system closure, and machine speed can all affect pigment retention.

Retention can be measured by making the paper and measuring its optical properties, or by using a Britt Jar, which controls various parameters and is close to manufacturing conditions. See, e.g. Example 1.

Separate retention aids and fixing agents have been developed to improve the wet end retention of pigments and other additives. However, these chemicals often result in coagulation (or flocculation) and must be used with care. Coagulating chemicals such as alum (aluminum sulfate) or polymers are added to form gelatinous precipitates or flocs, which absorb and enmesh the pigment. This can be difficult to control, and can affect the quality and surface characteristics of the paper. Thus, there is a need for pigments having a high wet end retention, without resort to fixing agents.

Known retention aids are often designed to affect the ionic balance of colloidal particles, including pigments, in the papermaking stock. Particles suspended in a liquid tend to have an electrical charge, and are surrounded by a dense layer of ions also having a specific electrical charge. This layer in turn is surrounded by a more diffuse charged layer, and the bulk liquid also has an electrical charge. The difference in electrical charge between the dense layer of ions and the bulk liquid is the zeta potential, usually measured in millivolts. In general, retention of colloids in a papermaking system tends to improve as the zeta potential approaches zero. Pulp fibers and filler colloids tend to be anionic, or negatively charged. Retention agents balance that charge with positive ions, such as ($Al^{3+}$) supplied as $Al_2(SO_4)_3$ or alum. Alum can neutralize negatively charged fiber and pigment colloids to zero zeta potential, and the resulting equilibrium improves wet end retention. However, the alum can also form an aluminum polymer which bridges from particle to particle, causing significant flocculation: large coagulants of ionically attracted particles can form.

Efforts have also been made to modify the anionic nature of papermaking fibers themselves. To this end, cellulose fibers have been reacted with materials that impart a positive charge to the fibers, for example by introducing cationic nitrogen atoms to side chains of the cellulose molecules. Known cationic pulp fibers are described in Gess, U.S. Pat. No. 4,624,743. Gess describes in particular a cellulose pulp product that is treated under alkaline conditions with a condensate of epichlorhydrin and dimethylamine, to produce a cationic product. These fibers are described as having improved anionic dye retention generally, and improved pigment retention under some conditions. Gess notes in particular (column 13 line 3) that his treatment is not a universal means for cationizing papermaking additives, and will not provide improved cationization or retention for all papermaking systems.

Other known cationic additives include cationic starch, and cationic kaolin clay. For example, cationized kaolin is described in European Patent No. 0382427 and in Nemeh et al, U.S. Pat. No. 4,767,466. Another known filler is cationic titanium dioxide, disclosed in Savino, U.S. Pat. No. 4,874,466. Savino discloses a filler formed of a papermaking pigment (e.g. titanium dioxide) mixed with a cationic water soluble polymer having at least 50% repeating units of quaternary ammonium salts. The quaternary material may be a copolymer of epichlorhydrin and dimethylamine. According to Savino, the cationic polymer increases the opacity and retention of titanium dioxide by promoting electrostatic attraction between anionic sites in the paper and the cationic charge imparted to the filler.

While some paper products might be made with cationic fibers, or using cationic agents and fillers, there remains a need for pigments which have improved wet end retention, without requiring special papers or separate additives. Novel cationic or positively charged pigments having improved wet end retention are now provided here. These pigments overcome flocculation problems associated with known additives, and are not limited to the use of specific pulps or papermaking stocks. The first pass retention of these new cationic pigments approaches 100%, and is markedly higher than for normal (untreated) pigments. Moreover, these new pigments can be made and used more economically than known retention aids or cationic pulp systems.

As one example, a structured aggregate pigment comprising a particulate material and a functional microgel, and available commercially as Norplex 604 (Nord Kaolin Company, Jeffersonville, Ga.) has a first pass retention of 4% in a conventional Britt Jar system. When treated according to the invention, the resulting pigment has a first pass retention of 94%.

SUMMARY OF THE INVENTION

It has now been discovered that aggregate structured pigments comprising a complex of particulate matter and a functional microgel can be further treated and cationized by a modified or unmodified condensation product of epichlorhydrin and dimethylamine.

A silicon or a silane compound may optionally be added, to control viscosity. For example, small amounts of $NH_2(CH_2)_2NH(CH_2)_3Si(OMe)_3$ can be used. The methoxy group can be substituted by any alkoxy group of two to four carbon atoms. A suitable silane compound is known as Z-6020, available from Dow Chemical Company. The amount of silane compound preferably is from 0.025 to 1.0% of the total ingredients, and 0.5% is particularly preferred.

Suitable structured pigments include those described in Kaliski, U.S. Pat. No. 5,116,418, the disclosures of which are incorporated by reference.

A preferred aggregate structured pigment comprises 60% calcined clay and 40% titanium dioxide as particulate matter, and a functional microgel comprising from less than 0.5% percent up to about 8 or 10 percent of the total formulation. One preferred formulation has a gel content of 0.3 to 0.35%. Another preferred formulation has a gel content of 8%. A pigment of this type is available commercially as Norplex 604 (Nord Kaolin Co.) Another suitable aggregate structured pigment is made with 100% hydrous non-calcined clay as the particulate matter. This pigment is available commercially as Norplex 100. These pigments may also contain a latex component, which can be added for strength and/or to modify the finish or other characteristics of the paper sheet.

The functional microgel is the product of a crosslinking reaction between an aqueous gel setting agent and an aqueous hydrosol mixture of ionic silicates and alkali-metal aluminates (e.g. sodium aluminate) or zincates. The gel setting agent can be a bivalent or monovalent inorganic salt (e.g. calcium chloride) and/or an organic cationically active compound with at least two reactive groups. The silicates can be alkali metal silicates (e.g. sodium silicate) and/or quaternary ammonium silicates.

Suitable Epi-DMA (epichlorhydrin dimethylamine) condensation products include condensations of epichlorhydrin with dimethylamine or with dimethylamine substituted with cross-linking agents such as ammonia or a primary aliphatic amine. Preferred Epi-DMA condensates are available from Nalco Chemical Company, Oak Brook, Ill., including Nalco N-7655 (unmodified Epi-DMA), Nalco N-7135 (with hexamethylene diamine or "HDMA" substituted DMA); and Nalco N-7607 (ammonia crosslinked Epi-DMA). Of these, the quaternary structure (Nalco 7607, or 3-chloro-2hydroxypropyl trimethyl ammonium chloride) is the most-preferred. The Epi-DMA condensate is used in relatively small amounts, such as 3 to 4% of the total ingredients. Other suitable condensates include Etadurine 31 and Etadurine 21 (Akzo Chemical Company) and Nalco 634. The structure of monomers used to make representative Epi-DMA condensates can be illustrated as follows:

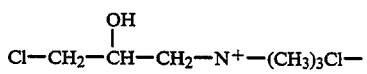    Nalco 7607

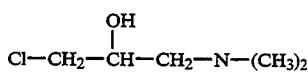    Nalco 7655

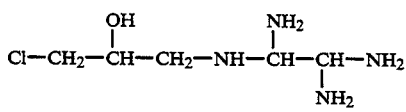    Nalco 8100

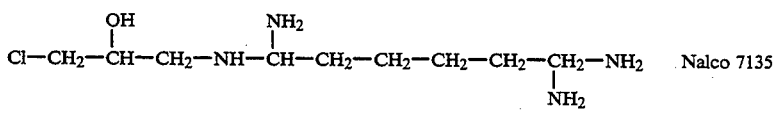    Nalco 7135

For convenience, the term "Epi-DMA," as used throughout this specification, includes any suitable modified or unmodified condensation product of epichlorhydrin and dimethylamine, and any derivatives or equivalents thereof.

The cationic pigments according to the invention are made by combining the Epi-DMA condensate with a slurry of structured microgel pigments under turbulent conditions. The reaction time and temperature are not critical. For improved dispersion and for convenience, rapid addition of Epi-DMA and room temperature reaction conditions are preferred. The slurry may have a maximum of about 50% solids. After treatment, the cationized material can be dried by conventional means, as by spray-drying at temperatures above 100° C. (e.g. 250°–300° C.). When silane is used, it must be added after the Epi-DMA condensate, and some additional mixing is advisable.

DETAILED DESCRIPTION OF THE INVENTION

According to the invention, anionic structured aggregate pigments can be cationized by treatment with an Epi-DMA condensate material. The structured pigment includes particulate material and a functional microgel, and may optionally include a cationic or anionic latex component, for added strength. The use of a cationic latex, however, has not been found to appreciably affect the charge or retention of the final structured pigment, and is not a suitable alternative to the Epi-DMA component. A silane component may be added, after cationization with Epi-DMA, to modify viscosity.

Experiments have shown that the Epi-DMA component should be applied to a liquid slurry, at any time after initiation of microgel formation (e.g. by addition of calcium chloride). Efforts to add the cationizing reactant earlier did not succeed, either because a structured pigment could not be formed or because the resulting product was not sufficiently cationic. For example, a cationic Epi-DMA condensate such as Nalco 7607 can be used in place of a calcium chloride gelling agent in a structured pigment formulation such as Norplex 100. However, additional Epi-DMA condensate must still be added after the pigment is formed, to obtain the desired cationic properties. This suggests that the Epi-DMA condensate does not react with or cationize the solid particle components of the structured pigment, and most likely reacts with the gel components, but only after the gel has been formed in Situ with the solid particles. In any case, it will be understood by skilled practitioners that the timing of Epi-DMA addition, as well as other operating parameters, can be varied over a wide range, depending on the results desired, such as viscosity and solids content. For example, when a solids content higher than about 40% is desired, it is possible to minimize viscosity problems by adding the Epi-DMA component first to a low solids slurry, followed by simultaneous addition of a higher solids structured pigment and additional Epi-DMA.

In theory, the Epi-DMA and/or silane compounds covalently bond to molecules of the microgel component of the structured pigment, via exposed oxygen atoms. This means of cationizing the pigment itself is different from the conventional addition of cationizing agents, such as long-chain cationic polyamine polymers, to a papermaking stock. The known retention aids affect the charge of the stock as a whole, but are believed to remain suspended in the papermaking mixture; they do not react with pigment. Further, the independent impact of the Epi-DMA and silane components on viscosity and zeta potential, shown below, suggest that these components bind to different reactive sites and have different bonding equilibriums.

It has been observed that the addition of Epi-DMA and/or silane to a slurry made from dry structured pigment (e.g. 43% solids) generally causes flocculation, but then becomes fluid. This suggests that the pigment particles, which are initially anionic (negatively charged) repel each other and are dispersed in the slurry. As the Epi-DMA (or silane) is added, the negative charges are neutralized, and the particles tend to agglomerate. As more of the cationizing material is added, the particles become positively charged and again repel each other, resulting in a cationic fluid. Thus, flocculation is a controlled and transient phenomenon which occurs (if at all) when the cationic pigment is manufactured, and not during the papermaking process. This is a significant advantage in comparison with known cationic retention aids, which are added to the wet end of the papermaking process. Known cationic additives often cause undesirable flocculation that can clog the papermaking machinery and change the surface quality of the paper.

EXAMPLE 1—Papermaking Pulp Preparation & Britt Jar Test

To evaluate the cationic pigments of the invention, a representative papermaking stock was prepared, comprising 50% hardwood pulp and 50% softwood pulp, with a 2.75% consistency and a 385 Canadian Standard Freeness. The stock was made by diluting approximately 30 dry grams of pulp with 2000 ml of water and stirring. Ten dry grams of pigment were added, and the mixture was stirred for two minutes. Then, 0.2 grams of dry Alum was added, the mixture was stirred for five minutes, and then was diluted to a total volume of 8 liters. The pH of the resulting mixture was adjusted to 8.0±0.2 with 10% NaOH. The final pigmented stock was evaluated using a conventional Britt Jar.

The Britt Jar was furnished with a stirring motor set for 1000 RPM. The Jar has an inlet for adding papermaking materials, and an outlet that communicates with a filter. The filter traps materials that are not retained by the system. Each step of the Britt Jar test was controlled by a timer, according to the following schedule (in seconds):

| Time | Event |
| --- | --- |
| 0 | Add 500 ml of Papermaking Stock |
| 20 | Start stirring motor |
| 25 | Add Retention Aid |
| 30 | Open outlet and collect filtrate for 30 seconds |
| 60 | Stop motor, wash and dry jar for next run. |

The filtrate was weighed and vacuum filtered through a tared ashless filter paper. After drying in an oven and cooling in a desiccator, the weight of the filter paper was determined. The filter paper was then ashed in a 900° C. oven for three hours, and the weight of the ash was determined. The amount of test material in the filtrate, and not retained by the papermaking stock, is the difference between the weight of the filter paper and the weight of the ash.

EXAMPLE 2—Preparation of Anionic Starter Pigments

According to the invention, anionic structured aggregate pigments comprising particulate material and a functional microgel are cationized to make novel cationic pigments. The anionic starter pigments can be made according to Kaliski, U.S. Pat. No. 5,116,418.

A preferred starter pigment is available commercially as Norplex 604 (or N-604; Nord Kaolin Company, Jeffersonville, Ga.). Norplex 604 is made as follows.

A representative structured aggregate pigment is made using a gel made from 2 parts sodium silicate hydrosol former, 2 parts sodium aluminate hydrosol former, and 4 parts calcium chloride gelling agent, per 100 parts solid particulate, by weight. First, a dilute slurry of approximately 20% particulate solids (e.g. kaolin clay) is prepared. In a preferred embodiment, such as Norplex 604, the particles consist of 60% calcined clay and 40% titanium dioxide. The aqueous particle slurry is divided into two equal portions. A 5% solids solution containing 2 parts sodium silicate (dry basis) is added under agitation to one slurry portion, and a 5% solids solution containing 2 parts sodium aluminate (dry basis) is added to the other portion. The slurry portions are thereafter recombined under violent agitation, to form a new slurry containing a sub-colloidal reactive sodium-silico-aluminate hydrosol.

Next, a 5% solids solution containing 4 parts calcium chloride gelling agent (dry basis) is quickly added, under violent and increasing agitation sufficient to maintain a vortex with rapid and uniform distribution of the gelling agent. Under these conditions, a flocculated particulate/functional microgel slurry is formed in about 2 seconds after the step of adding calcium chloride begins. This slurry can be filtered and dewatered, with or without aging, and then can be rinsed and dried to provide a filtercake. The filtercake can then be pre-crushed and comminuted using conventional pulverizing equipment.

In practice, the sodium aluminate can be replaced in whole or in part by sodium zincate or another hydrosol former. The calcium chloride component can be replaced by calcium nitrate or another gelling agent. A latex component, such as a styrene butadiene latex, can be added prior to gelling.

Structured pigments may be supplied in several forms, including slurry, dry (pulverized), as a wet or dry filterpress cake, and as a vacuum filter cake. All forms are suitable for the invention, although some are preferred for ease of handling. Thus, dry pulverized pigment tends to have a better (lower) viscosity during formulation than wet filterpress cake. Oven-dried filterpress cake has a better viscosity than wet cake, but not as good as dry pulverized pigment. As noted, however, viscosity can be modified by adding a silane compound, and/or by adjusting the solids content of the pigment slurry or the amount of Epi-DMA condensate used for cationization.

In another embodiment, the microgel can be prepared independently, e.g. from its silicate, aluminate and gel forming components, and thereafter blended with a slurry of particulate material.

EXAMPLE 3—Pigment Preparation & Britt Jar Ash Retention

Each pigment to be cationized is slowly added to water, without any dispersant, until a fluid homogeneous slurry with a maximum solids content was obtained. The pigment may be added, as a slurry, dry, as a rotary vacuum cake, or as a filterpress cake. One suitable example is Norplex 604 (Nord Kaolin Company). An Epi-DMA condensate, such as Nalco 7607, is added to this slurry. If desired, a silane compound such as Dow Corning Z6020 may be added after the Epi-DMA condensate, to reduce viscosity.

Several sample preparations were made, as shown below in Table 1. In each case, the untreated pigment was diluted with water to a calculated percent of solids. The actual solids content may vary, and may be affected by the addition of other additives. Viscosity may also be affected by the addition of other additives. In particular, the viscosity (λ) of the pigment slurry tends first to increase and then decrease with increasing amounts of Epi-DMA condensate. However, it was found that a minimum viscosity tends to be reached, after which additional condensate does not materially affect viscosity. In the range tested, no viscosity change occurred at concentrations of Epi-DMA in excess of 75 lbs/ton of untreated pigment, up to about 135 lbs/ton.

It was also discovered that the particle size of cationized pigments according to the invention was substantially the same as or finer than untreated pigments. Neither cationization, nor cationization with addition of a silane (e.g. Dow Z-6020), caused a change in the black glass scattering coefficient of the final cationic pigment, in comparison with an untreated pigment. The scattering coefficient can be lowered, however, by adjusting the pH to below 6.6. All of the tested pigments passed through a 325 mesh filter without residue.

The ash retention of each treated and cationic pigment was tested using a Britt Jar, and the results for representative formulations are shown in Table 1. Each test was run in duplicate. The retention aid was added in amounts of 0, 0.25, 0.5, and 1 lb of retention aid per ton of stock mixture. As Table 1 shows, ash retention for each of the treated cationic pigments ranged from 76 to 100%, while the untreated control did not exceed 4%. This is a dramatic and surprising improvement.

In general, the cationic pigment is made by adding a desired amount of Epi-DMA condensate to a slurry of anionic structured pigment having a desired solids content. Thereafter, a silane compound can be added to improve viscosity, and the starting pigment can be formulated with or without a latex compound for strength characteristics. The Epi-DMA and silane can be added quickly, with stirring, for homogenous dispersion, but the mixing time is not critical.

When using a starting pigment provided as a filter cake, it is advisable to dilute the pigment with water to provide a fluid cake. A preferred solids content for this kind of starting pigment is less than 50%, preferably about 44%. A higher solids content, while feasible, is difficult to handle and may hamper dispersion during mixing, for example, with a conventional drill press. Epi-DMA condensate may be added to the fluid cake until it passes through a flocculation stage, and again reaches a fluid condition. Additional Epi-DMA can be added, but preferably is stopped at or near the point when the mixture is fluid or when an equilibrium or plateau viscosity is obtained. As one example, a 44% slurry of Norplex 604 filter cake can be combined with about 90 lbs/ton of Nalco 7607 Epi-DMA condensate, to obtain a final solids content of 43.9%. This mixture can be further treated with 6 lbs/ton of Dow Z-6020 silane.

TABLE 1

BRITT JAR ASH RETENTION OF CATIONIC PIGMENTS

| # | % Solids Feed/Measured Norplex 604 | Pounds/Ton of Pigment Nalco 7607 | Pounds/Ton of Pigment Dow Z-6020 | Note | % First Pass Ash Retention (lbs Nalco 7533/ton of stock) 0 | .25 | .50 | 1 |
|---|---|---|---|---|---|---|---|---|
| 1 | 55/53.2 | 0 | 0 | Control[1] | 0 | 0.6 | 4 | 2.7 |
| 2 | 40/42.0 | 60 | 0 | High λ[2] | 12.2 | 82.3 | 93.9 | 99 |
| 3 | 40/41.0 | 60 | 1 | Med. λ | 14.8 | 88.8 | 74.4 | 100 |
| 4 | 40/41.1 | 65 | 0 | Med. λ | 19.2 | 81.2 | 93.9 | 100 |
| 5 | 40/40.6 | 65 | 1 | Low λ | 15.5 | 76.1 | 87.5 | 98.4 |
| 6 | 44/28.6 | 65 | 1 | Sprayed[3] | 8.8 | 79.9 | 84.1 | — |
| 7 | 40/41.3 | 60 | 0 | Latex | 14 | 75.3 | 100 | — |
| 8 | 40/42.7 | 60 | 0 | Hycar[4] | 18.3 | 74.6 | 90.3 | — |
| 9 | 40/40.0 | 65 | 0 | No Latex | 16.3 | 84.1 | 95.1 | — |

| | Norplex 100 | Nalco 7607 | Dow Z-6020 | Note | 0 | .25 | .50 | 1 |
|---|---|---|---|---|---|---|---|---|
| 10 | 40/43.7 | 40 | 0 | Test | 9.41 | 55.1 | 71.2 | 87.5 |
| 11 | 50/49.1 | 0 | 0 | Control[5] | 6.4 | 24.8 | 35.2 | 43.7 |

[1] 30 lbs/ton Rohm & Haas 9400 (Philadelphia, PA) used in place of Nalco 7607 and dispersed in slurry with blender (10 min) then stirred for 1 hr.
[2] λ = viscosity
Representative viscosity tests had the following results:

| Batch Sample | Brookfield Viscosity (CP) (20 RPM, Various Spindles) | | | |
|---|---|---|---|---|
| | Day 0 | Day 2 | Day 7 | Note |
| 2 | 2950 | 2350 | 3750 | High |
| 3 | 1640 | 1660 | 2350 | Medium |
| 4 | 1080 | 1500 | 2900 | Medium |
| 5 | 120 | 920 | 1550 | Low |

[3] Batch 6 was diluted to 30% solids, spray dried, added to water and dispersed in a blender (5 min). The resulting slurry was diluted to 30% solids, and screened through a 325 mesh.
[4] Hycar latex (B. F. Goodrich, Cleveland, OH) used in place of regular latex formation.
[5] 10 lbs/ton Dispex N-40 (Allied Colloids, Suffolk, VA) and 20 lbs/ton TSPP (tetrasodium pyrophosphate) used in place of Nalco 7607.

Tests for zeta potential confirmed that the untreated pigments were anionic while the treated pigments were cationic. Untreated Norplex 604 (e.g. Table 1, Batch 1) had a tested zeta potential of about −42. Norplex 604 treated according to the invention had a zeta potential of about +32 (without silane) and about +42 (with silane). The addition of silane appears to increase the zeta potential, but in the test system this slightly reduced the observed ash retention (Table 1). The principle impact of the silane (e.g. Z-6020) was on viscosity, which also was affected by the amount of Epi-DMA condensate (e.g. Nalco 7607). For example, Brookfield viscosity tended to level off at about 1300 CP and 50% solids, using 75 lbs/ton of Nalco 7607. When 3 lbs/ton of Z-6020 was added, the viscosity dropped to about 500 CP, at 52% solids.

Hercules mobility tests and color reaction tests with Toluidine blue 0 also confirmed that the untreated control pigments are anionic, while pigments treated according to the invention are cationic. In a representative Hercules Mobility test, untreated Norplex 604 migrated to a value of −92. Norplex 604 treated according to the invention migrated to a value of +72.

The proportions and solids content of structured pigment, Epi-DMA condensate, and silane compound are not critical, and can be adjusted as desired to obtain different papermaking conditions and paper characteristics, such as viscosity, zeta potential, weight and surface finish, etc. For commercial purposes it has been found that the solids content of the initial charge of structured pigment can range up to 100 percent. The solids content of the final stock mixture generally will range up to about 55 percent. The Epi-DMA can generally be added in amounts ranging from up to about 150 lbs/ton of structured pigment. The silane compound can be added in amounts of from about 0 to about 6 lbs/ton.

Suitable formulations include a mixture of 52% solids comprising 75 lbs/ton of Epi-DMA (e.g. Nalco 7607) in a slurry made from dry structured pigment (e.g. Norplex 604), followed by the addition of 3 lbs/ton of silane (e.g. Z-6020).

EXAMPLE 4—Effect of Cationization on Papermaking Properties

Several formulations according to the invention were evaluated for particle size, scattering coefficient, viscosity (in centipoise or cp) and pH. The tested formulations and the test results are set forth in Table 2.

TABLE 2

| | PROPERTIES OF CATIONIC PIGMENTS | | | | | | | | |
|---|---|---|---|---|---|---|---|---|---|
| | | Pounds/Ton of Pigment | | | | Properties | | | |
| | % Solid | | Dow | | | | | | |
| | Norplex | Nalco | Z602 | ASE | Nalco | Size | | Scat. | |
| # | 604 | 7607 | 0 | 60 | 634 | >2 | >1 | Coef. | λ CP | pH |
| 12 | 52.3 | 75 | 0 | 0 | 0 | 87.2 | 70.1 | 0.604 | 1480 | |
| | | | | | | | | 0.602 | | |
| 13 | 52.4 | 75 | 3 | 0 | 0 | 87.8 | 73.2 | 0.592 | 280 | |
| | | | | | | | | 0.613 | | |
| 14 | 51.6 | 75 | 3 | 2 | 0 | 85.3 | 65.9 | 0.601 | 460 | |
| | | | | | | | | 0.586 | | |
| 15 | 50.7 | 100 | 3 | 0 | 0 | — | — | 0.565 | — | 8.8 |
| | | | | | | | | 0.504 | | |
| 16 | 47.7 | 100 | 6 | 0 | 0 | — | — | 0.504 | — | 6.6 |
| | | | | | | | | 0.535 | | |
| 17 | 49.03 | 0 | 0 | 0 | 110 | — | — | 0.574 | — | — |

As Table 2 shows, cationization and/or silane treatment does not appreciably affect particle size or scattering coefficient, but does affect viscosity (λ).

EXAMPLE 5—Comparison of Cationic & Anionic Pigments

Representative batches of cationic pigment were made for comparison with known cationic additives. The test formulations and ash retention results are shown below.

TABLE 3

| FIRST PASS BRITT JAR ASH RETENTION OF VARIOUS PIGMENTS |
|---|

Norplex 604 Formulations
Retention given as: 1st Pass Retention (unshaded) / First Pass Ash Retention (shaded)

| Nalco 7533 | Without Coagulant | | | | | | | | | | With Coagulant: 2.5 lbs/ton Nalco 7583 | | | | | | | | | |
|---|---|---|---|---|---|---|---|---|---|---|---|---|---|---|---|---|---|---|---|---|
| lbs/ton | 604-0 | | TiO₂ | | 604-1 | | 604-2 | | CaCO₃ | | 604-0 | | TiO₂ | | 604-1 | | 604-2 | | CaCO₃ | |
| 0.25 | 71 | 0 | 77 | 20 | 92 | 73 | 92 | 73 | 83 | 41 | 73 | 9 | 82 | 39 | 99 | 94 | 94 | 78 | 95 | 81 |
| 0.50 | 73 | 7 | 80 | 30 | 97 | 86 | 96 | 84 | 87 | 54 | 76 | 18 | 82 | 39 | 99 | 95 | 98 | 91 | 98 | 90 |
| 0.75 | 73 | 7 | 79 | 29 | 99 | 93 | 97 | 88 | 92 | 70 | 77 | 22 | 83 | 40 | 98 | 91 | 99 | 93 | 98 | 90 |
| 1.00 | 76 | 6 | 79 | 28 | 100 | 97 | 98 | 90 | 95 | 80 | 78 | 24 | 81 | 36 | 100 | 96 | 100 | 97 | 97 | 88 |

| | Test Pigment + 75% CaCO₃ | | | | | | | | | | | | | | | |
|---|---|---|---|---|---|---|---|---|---|---|---|---|---|---|---|---|
| Nalco 7533 | No Additional Material | | | | | | | | Additional Material: 2.5 lbs/ton Nalco 7583 | | | | | | | |
| lbs/ton | 604-0 | | TiO₂ | | 604-1 | | 604-2 | | 604-0 | | TiO₂ | | 604-1 | | 604-2 | |
| 0.25 | 80 | 32 | 85 | 49 | 89 | 62 | 90 | 63 | 97 | 88 | 94 | 78 | 98 | 92 | 98 | 90 |
| 0.50 | 85 | 47 | 93 | 76 | 97 | 86 | 95 | 79 | 97 | 88 | 97 | 88 | 100 | 96 | 98 | 92 |
| 0.75 | 89 | 62 | 96 | 85 | 98 | 92 | 98 | 92 | 98 | 90 | 98 | 91 | 100 | 96 | 98 | 90 |
| 1.00 | 90 | 64 | 95 | 80 | 99 | 93 | 99 | 95 | 97 | 88 | 97 | 86 | 100 | 98 | 99 | 95 |

Pigment 604-0 is untreated anionic Norplex 604
Pigment 604-1 is a cationic pigment made by mixing a 44% solids repulped slurry of Norplex 604 with 90 lbs/ton of Nalco 7607 Epi-DMA condensate. This pigment had a zeta potential of +32.
Pigment 604-2 is the same as 604-1, except that 6 lbs/ton of Dow Z-6020 silane compound were added after cationization with Nalco 7607. 604-2 had a zeta potential of +42.

Each of the anionic and cationic structured pigments (604-0, 604-1 and 604-2) were tested in a papermaking stock having an additional flocculent ingredient, Nalco 7533, in an amount of 0.25, 0.5, 0.75, and 1 lbs/ton. As shown in Table 3, some formulations also had 2.5 lbs/ton of coagulant, Nalco 7583. These pigments were compared with papermaking stock having titanium dioxide (TiO₂) or calcium carbonate (CaCO₃) fillers. Another series used a papermaking stock having 25% structured pigment and 75% calcium carbonate filler.

As shown in Table 3, the untreated anionic structured pigment (Norplex 604-0) had a lower ash retention than titanium dioxide and calcium carbonate, even with the flocculent (Nalco 7533) and whether or not a coagulant was used (Nalco 7583). In sharp contrast, the cationic structured pigments (Norplex 604-1 and 604-2) had a higher ash retention than the other fillers and apart from known retention aids. This was also true when the structured pigment was used in combination with calcium carbonate: the cationic structured pigments demonstrated superior retention.

The observed ash retention of 604-1 (without silane) was higher than for 604-2 (with silane). This is surprising, because the zeta potential is higher for 604-2.

EXAMPLE 6—Study of Anionic Pigments & Titanium Dioxide

The retention of an anionic structured pigment (Norplex 604) was compared to titanium dioxide (rutile $TiO_2$) in an alkaline wood free furnish at 25% filler addition. The comparison was made in a single pigment system and in a mixture of 25% test pigment and 75% Albacar ($CaCO_3$) pigment (Pfizer, New York, N.Y.). A Britt Jar at 1000 RPM was used to measure retention.

Anionic Norplex 604 has a lower first pass and ash retention than $TiO_2$. In a single pigment system this difference is significant, with first pass ash retention of $TiO_2$ some 9 to 36% higher than Norplex 604. In a 75% Albacar system the difference is much less significant (0 to 11%).

Conventional retention aids were also tested in these anionic pigment systems. Different combinations of coagulant (Nalco 7585 or 7583) and flocculent (Nalco 7533 or Hydraid 777) were tested. The best results were obtained using Nalco 7583 as a coagulant and Nalco 7533 as a flocculent. Hydraid 777, a high molecular weight cationic polymer, had the least effect on retention under test conditions.

A. Albacar (precipitated calcium carbonate from Pfizer
B. Anionic Norplex 604
C. $TiO_2$
D. 25% Norplex 604 + 75% Albacar
E. 25% $TiO_2$ + 75% Albacar.

The coagulants used were:
1. None
2. Nalco 7585 (1.25, 2.50, 3.75, 5.00 lbs neat/ton)
3. Nalco 7583 (1.25, 2.50, 3.75, 5.00 lbs neat/ton)

The flocculants used, in amounts of 0.25, 0.50, 0.75 and 1.00 lb/ton, were:
4. None
5. Hydraid 777 (without coagulant)
6. Nalco 7533.

Nalco 7585 Polyacrylate Coagulant & 7533 Flocculent

All five pigment systems (N-604, $TiO_2$, Albacar, N-604 + Albacar, $TiO_2$ + Albacar) had a first pass retention of 69 to 74% and an ash retention of 3-12%—without retention aids. Adding 1.25 to 5.00 lbs neat/ton of Nalco 7585 coagulant, with no flocculent, did not significantly improve retention. The first pass retention for these formulations ranged from 68 to 75% and the ash retention ranged from 1 to 19%. Adding 0.25 to 1.00 lb active/ton of Nalco 7533 flocculent significantly increased the retention for the pigment + Albacar systems, but not for Norplex 604 and $TiO_2$ single pigment systems. These results are shown in Table 4.

TABLE 4

RETENTION OF NORPLEX 604 & $TiO_2$ USING A POLYACRYLATE COAGULANT AND AN ACRYLAMIDE ACRYLATE FLOCCULENT

| | % First Pass Retention | | | % First Pass Ash Retention | | |
|---|---|---|---|---|---|---|
| | No Retention Aid | Flocculent Only (Nalco 7533) | Flocculent Plus Coagulant (Nalco 7585) | No Retention Aid | Flocculent Only (Nalco 7533) | Flocculent Plus Coagulant (Nalco 7585) |
| | AMOUNTS | | | AMOUNTS | | |
| Pigment System | 0 | 0.25–1.00 | 1.25–5.00 | 0 | 0.25–1.00 | 1.25–5.00 |
| Albacar | 69 | 85–95 | — | 7 | 56–88 | — |
| 25% N-604 75% Albacar | 69 | 80–89 | 81–93 | 3 | 41–64 | 45–75 |
| 25% $TiO_2$ 75% Albacar | 72 | 83–93 | 79–95 | 7 | 44–70 | 44–81 |
| N-604 | 70 | 72–74 | — | 5 | 8–13 | — |
| $TiO_2$ | 73 | 75–81 | — | 12 | 0–6 | — |

Nalco 7585 is a cationic polyacrylate and Nalco 7583 is a cationic polyquaternary amine. Nalco 7533 is an anionic acrylamide/acrylate polymer and Hydraid 777 is a cationic copolymer available from Calgon.

The tests were conducted using a papermaking formulation having 30 dry grams of pulp (50% bleached hardwood kraft and 50% bleached softwood kraft at 2.8% consistency and 400 C.S.F.) mixed in 2000 ml of water. Ten dry grams of pigment was added, to obtain a 25% filler addition alkaline uncoated wood free furnish. Then, 0.5% (dry/dry) hydrous aluminum sulfate (0.20 g) was added. The appropriate coagulant was added, and the mixture was diluted to 0.5% consistency (8 liters). The pH was adjusted to 8.0 with dilute NaOH, and 500 ml was added to a Britt Jar with an orange papermaking wire at 1000 RPM. After five seconds of mixing at 1000 RPM, the appropriate flocculent was added, followed by another five seconds of mixing. Then, the Britt Jar was drained for 30 seconds, and the first pass and ash retention was determined as described in Example 1.

The five pigment preparations tested were:

Norplex 604 had a 4–14% lower first pass retention and a 12–36% lower first pass ash retention compared to $TiO_2$ in a single pigment system using 0.25 to 1.00 lbs/ton Nalco 7533 and 1.25 to 5.00 lbs/ton Nalco 7585. The difference was not significant in a dual pigment system with 75% Albacar.

Nalco 7583 Polyquaternary Amine Coagulant & 7533 Flocculent

Norplex 604 had a 6 to 11% lower first pass retention and a 9 to 26% lower first pass ash retention compared to $TiO_2$ in a single pigment system, with 1.25 to 2.50 lbs/ton of Nalco 7583 and 0.25 to 1.00 lbs/ton of Nalco 7533. The first pass retention was 1 to 5% lower for Norplex 604 than for $TiO_2$ in the formulations having 75% Albacar. The first pass ash retention was 6 to 11% lower for Norplex 604 in the 75% Albacar formulations. The results are shown in Table 5.

Hydraid 777 Retention Aid

Cationic high molecular weight polymers can be used as retention aids in some papermaking systems and for some pigments. One of these is Hydraid 777 (Calgon, Pittsburgh, Pa.). However, 0.25 to 1.00 lbs/ton of Hydraid 777 did not significantly improve the retention of anionic Norplex 604 or $TiO_2$ in a single pigment system. First pass retention for Norplex 604 and $TiO_2$ in this formulation was 68 to 76% and ash retention was 6 to 27% In the 75% Albacar formulation, the Norplex 604 was 5 to 6% lower in first pass retention and 5 to 11% lower in ash retention than the $TiO_2$.

Comparative Retention of Anionic & Cationic Pigments

As shown here, the retention of a structured pigment such as anionic Norplex 604 can be improved in some papermaking systems by using a combination of retention aids (such as coagulants and flocculants), especially when the structured pigment is not the only pigment in the system (e.g. 25% pigment and 75% other fillers). The improvement is less marked, and is frequently insignificant, in a single pigment system.

TABLE 5

FIRST PASS RETENTION AND FIRST PASS ASH RETENTION OF ANIONIC PIGMENTS & $TiO_2$ WITH RETENTION AIDS

| Pigment System FIRST PASS RETENTION | Albacar | | Norplex 604 | | | $TiO_2$ | | | 25% Norplex 604 75% Albacar | | | 25% $TiO_2$ 75% Albacar | | |
|---|---|---|---|---|---|---|---|---|---|---|---|---|---|---|
| Nalco 7583 Coagulant (lbs neat/ton) Nalco 7533 Flocculent (lbs active/ton) | 0.00 | 2.50 | 0.00 | 1.25 | 2.50 | 0.00 | 1.25 | 2.50 | 0.00 | 1.25 | 2.50 | 0.00 | 1.25 | 2.50 |
| 0.00 | 69.3 | 71.0 | 70.0 | 70.9 | 70.9 | 73.3 | 70.4 | 71.5 | 69.1 | 71.5 | 70.2 | 71.7 | 69.8 | 71.2 |
| 0.25 | 84.9 | 90.0 | 72.3 | 71.1 | 71.8 | 75.4 | 78.9 | 78.2 | 80.3 | 84.2 | 84.0 | 82.8 | 84.7 | 87.1 |
| 0.50 | 88.3 | 95.6 | 72.7 | 75.1 | 74.9 | 78.6 | 83.5 | 83.4 | 86.1 | 88.7 | 90.5 | 91.2 | 91.4 | 93.0 |
| 0.75 | 93.4 | 99.2 | 75.0 | 75.1 | 76.6 | 79.3 | 84.3 | 84.4 | 87.7 | 91.3 | 92.4 | 92.8 | 93.3 | 96.1 |
| 1.00 | 94.7 | 98.5 | 74.4 | 74.3 | 77.7 | 81.1 | 84.8 | 85.7 | 88.5 | 92.5 | 93.5 | 92.6 | 96.9 | 98.1 |
| ASH RETENTION | Albacar | | Norplex 604 | | | $TiO_2$ | | | 25% Norplex 604 | | | 25% $TiO_2$ | | |
| Nalco 7583 Coagulent (lbs neat/ton) Nalco 7533 Flocculent (lbs active/ton) | 0.00 | 2.50 | 0.00 | 1.25 | 2.50 | 0.00 | 1.25 | 2.50 | 0.00 | 1.25 | 2.50 | 0.00 | 1.25 | 2.50 |
| 0.00 | 7.4 | 11.0 | 4.9 | 4.4 | 2.8 | 12.0 | 3.4 | 2.3 | 3.2 | 4.5 | 3.9 | 7.3 | 4.5 | 7.4 |
| 0.25 | 55.9 | 75.3 | 8.0 | 4.9 | 6.0 | 0.0 | 14.4 | 20.8 | 41.1 | 49.5 | 55.0 | 44.3 | 58.0 | 63.7 |
| 0.50 | 71.5 | 84.2 | 12.4 | 10.0 | 13.5 | 2.1 | 25.7 | 31.8 | 56.8 | 64.5 | 70.9 | 62.5 | 71.1 | 79.0 |
| 0.75 | 82.7 | 94.4 | 11.8 | 10.9 | 14.7 | 5.4 | 29.6 | 40.2 | 61.7 | 72.4 | 75.9 | 68.6 | 80.8 | 84.0 |
| 1.00 | 85.5 | 97.0 | 13.0 | 13.4 | 17.0 | 5.7 | 32.1 | 38.8 | 64.2 | 74.3 | 79.4 | 70.4 | 84.6 | 90.4 |

This suggests that the known retention aids are effective for particulate fillers such as Albacar, but are much less effective for structured pigments such as Norplex 604. Moreover, the particular retention aids and their proportions must be carefully matched to each papermaking system, usually by trial and error, to obtain the desired properties (when possible).

A comparison with Examples 1 through 6 shows that the retention of a cationic structured pigment, made and cationized according to the invention, is uniformly much higher than the retention of an untreated structured pigment or of titanium dioxide. This improvement is obtained with minimum amounts of anionic retention aids and no cationic coagulant type retention aids in the paper making formulation. This improvement minimizes the potential hazards of high levels of coagulants and flocculants, which can adversely affect the quality of the finished paper sheets.

We claim:

1. A pigment comprising: a structural aggregate of a particulate material and a microgel, and a modified or unmodified epichlorohydrin dimethylamine condensate, wherein said pigment is cationic.

2. A pigment according to claim 1, additionally comprising at least one of a latex component and a silane component.

3. A pigment according to claim 1, wherein the particulate material is at least one of hydrous clay, calcined clay, and titanium dioxide.

4. A pigment according to claim 1, wherein the microgel component is made from reactants selected from the group consisting of alkali-metal silicates and quaternary ammonium silicates; reactants selected from the group consisting of alkali-metal aluminates and alkali-metal zincates; and reactants selected from the group consisting of calcium chloride, and calcium nitrate.

5. A pigment according to claim 1, wherein the microgel component is made from sodium silicate and sodium aluminate gel formers and a calcium chloride gelling agent.

6. A pigment according to claim 1, wherein the epichlorhydrin dimethylamine condensate is at least one of unmodified, hexamethylene-substituted, and cross-linked epichlorhydrin dimethylamine condensate.

7. A pigment according to claim 1, wherein the epichlorhydrin dimethylamine condensate has a monomer component of the formula

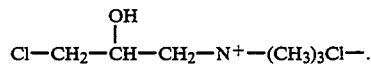

8. A pigment according to claim 2, wherein the latex is a styrene butadiene latex.

9. A pigment according to claim 2, wherein the silane component has the formula $NH_2(CH_2)_2NH(CH_2)_3Si(OMe)_3$.

10. A pigment according to claim 1, wherein the solids content is up to about 55 percent, by weight.

11. A pigment according to claim 1, wherein the epichlorhydrin dimethylamine condensate is used in an amount of up to about 150 pounds per ton of structured aggregate.

12. A pigment according to claim 2, wherein the silane component is used in an amount of up to 6 pounds per ton of structured aggregate.

13. A pigment composition made by treating an anionic structural aggregate pigment having a particulate component and a microgel component with a modified or unmodified epichlorohydrin dimethylamine condensate to cationize said pigment.

14. A pigment according to claim 13, wherein the particulate component is at least one of hydrous clay, calcined clay and titanium dioxide, the microgel component is made from sodium silicate and sodium aluminate gel formers and a calcium chloride gelling agent, and the epichlorhydrin dimethylamine condensate is at least one of unmodified, hexamethylene-substituted, and cross-linked epichlorhydrin dimethylamine condensate.

15. A pigment according to claim 13, wherein treatment with epichlorhydrin dimethylamine condensate is followed by addition of a silane component.

16. A pigment according to claim 14, wherein treatment with epichlorhydrin dimethylamine condensate is followed by addition of a silane component.

17. A pigment according to claim 16, wherein the particulate material is 60% calcined clay and 40% titanium dioxide, the microgel is made from sodium silicate, sodium aluminate and calcium chloride in a 2:2:4 ratio by weight, the epichlorhydrin dimethylamine condensate is crosslinked and is used in an amount of about up to 150 lbs/ton of structural aggregate, and the silane compound is used in an amount of about 0 to 6 lbs/ton of structural aggregate.

18. A pigment according to claim 17, wherein the epichlorhydrin dimethylamine condensate includes a monomer component of the formula

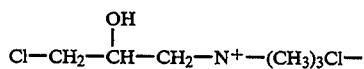

and the silane component has the formula $NH_2(CH_2)_2NH(CH_2)_3Si(OMe)_3$.

19. A method for cationizing a structured aggregate pigment having a microgel component, comprising the step of treating a slurry of the pigment with a modified or unmodified epichlorhydrin dimethylamine condensate.

20. A method according the claim 19, wherein a silane component is added after treatment with the epichlorhydrin dimethylamine condensate.

21. A method according to claim 20, wherein the epichlorhydrin condensate is added with mixing in an amount of about up to 150 lbs/ton and the silane is added with mixing in an amount of about 0 to 6 lbs/ton of structural aggregate pigment.

22. A method according to claim 19, wherein the structural aggregate pigment is made by in situ formation of an aluminosilicate microgel in an aqueous slurry of particulate material.

23. A method according to claim 22, wherein the particulate material is at least one of hydrous clay, calcined clay and titanium dioxide, and wherein the aluminosilicate microgel is formed under violent agitation from aluminum and silicate gel formers and a calcium chloride gelling agent in a ratio of 2:2:4, by weight.

24. A method according to claim 20, wherein the epichlorhydrin dimethylamine condensate has the monomer formula

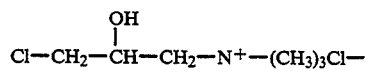

and the silane component has the formula $NH_2(CH_2)_2NH(CH_2)_3Si(OMe)_3$.

25. A pigment according to claim 5, wherein the microgel component is from 0.3 to 10% by weight of the structural aggregate.

26. A pigment according to claim 1, wherein said epichlorohydrin dimethylamine condensate is added in an amount sufficient to improve retention, compared to a pigment without said condensate.

* * * * *